United States Patent [19]

Kowalski

[11] 4,285,379
[45] Aug. 25, 1981

[54] FASTENER

[75] Inventor: Joseph W. Kowalski, Florissant, Mo.

[73] Assignee: B-Line Systems, Inc., Highland, Ill.

[21] Appl. No.: 76,461

[22] Filed: Sep. 17, 1979

[51] Int. Cl.³ .............................................. F16B 39/00
[52] U.S. Cl. ...................................................... 411/85
[58] Field of Search ............... 151/41.75, 41.71, 41.76; 85/32 K, 1 H, 5 P

[56] References Cited

U.S. PATENT DOCUMENTS

| | | | |
|---|---|---|---|
| 1,306,100 | 6/1919 | Chadwick | 85/1 H |
| 3,483,910 | 12/1969 | La Londe et al. | 151/41.75 |
| 3,493,025 | 2/1970 | La Londe et al. | 151/41.75 |
| 4,146,074 | 3/1979 | Kowalski | 151/41.75 |

FOREIGN PATENT DOCUMENTS

| | | | |
|---|---|---|---|
| 513368 | 10/1939 | United Kingdom | 151/41.75 |
| 1061149 | 3/1967 | United Kingdom | 151/41.75 |

*Primary Examiner*—Ramon S. Britts
*Attorney, Agent, or Firm*—Senniger, Powers, Leavitt and Roedel

[57] ABSTRACT

A fastener for securing parts to metal framing such as channel framing having side flanges with inwardly turned, hook-shaped lips defining a slot therebetween. The fastener comprises an elongate body or nut having inside and outside faces, opposite sides and opposite ends, a width less than that of the slot and a length greater than the width of the slot. The fastener also includes a clamp member carried on the outside face of the nut for engaging the curved outside faces of the channel lips, a retainer on the inside face of the nut and engageable therewith, and guide members extending from the clamp member to a position beyond the inside face of the nut and the retainer. At least one of the guide members has a portion bent to provide a spring finger engageable with the retainer for providing spring action tending to draw the clamp member in the direction back toward the outside face of the nut thereby to clamp the clamp member and nut against respective outside and inside faces of the channel lips.

8 Claims, 5 Drawing Figures

FASTENER

BACKGROUND OF THE INVENTION

This invention relates generally to fasteners for fastening objects to metal channel framing and, more particularly, to a nut having means thereon for clamping the nut to the channel prior to and during securement of the object to the channel.

Electrical conduit, pipes, fixtures, etc. are commonly supported overhead or vertically by channel framing conventionally having side flanges with inwardly turned, hook-shaped lips defining a slot therebetween. Typically, an elongate nut (narrower but longer than the width of the slot) is used for securing objects to the framing, the nut first being aligned with, entered into and passed through the slot, and then turned 90° to a crosswise position with the outside face of the nut engaging the inside faces of the channel lips. Various means have heretofore been used for holding the nut against the channel in its crosswise position prior to and during securement of an object to the channel.

One such means is a coil compression spring on the inside face of the nut. Upon insertion of the nut into the channel, this spring reacts from the channel bottom and pushes the nut against the channel lips. This arrangement has several serious disadvantages, however, one being that each channel of different depth requires a spring of correspondingly different lenth, thus greatly increasing the number of fastener sizes which have to be stocked. Moreover, while securing parts to the framing, the nuts tend to tilt and topple over into the channel. It is also difficult to use the channel as a raceway for conduit, wires or the like since the spring substantially blocks the entire channel.

Other prior art devices utilize a coil spring attached to the outside face of the nut for spanning the channel and pulling the nut into engagement with the channel lips. This type of device also has its drawbacks, however, inasmuch as the spring tends to slip off the lips of the channel and the nut to fall into the channel.

The fastener disclosed in my U.S. Pat. No. 4,146,074, issued Mar. 27, 1979, solves the aforementioned problems in that it provides a clear channel for carrying conductors and remains securely in place on the channel prior to and during securement of an object to the channel. However, while the installation and use of this fastener have been entirely satisfactory, its manufacture has required that the sides of the nut be slotted. This, of course, requires a separate machining step with its attendant costs. Moreover, it makes the fastener more difficult to assemble, thereby increasing labor costs.

Reference may be made to U.S. Pat. Nos. 1,306,100 and 3,483,910, and British Pat. Nos. 513,368 and 1,061,149, all of which disclose fasteners of the same general type as that of the fastener of this invention.

SUMMARY OF THE INVENTION

Among the several objects of this invention may be noted the provision of a fastener which is readily installed on a channel and self-retaining thereafter; the provision of such a fastener which remains securely in place on the channel prior to and during securement of an object to the channel; the provision of such a fastener which provides a clear channel for carrying an increased number of conductors; the provision of such a fastener which fits channels of all depths, thus reducing the number of fastener sizes which need to be stocked; and the provision of such a fastener which is economical to produce and easy to assemble.

Briefly, an improved fastener of this invention, which is useful for securing a part to metal framing having a slot and inside and outside faces on opposite sides of the slot, comprises an elongate body having an inside and an outside face, opposite sides and opposite ends. The width of the body is less than that of the slot in the framing whereby the body may be generally aligned with the slot, entered into the slot and passed through the slot from the outside to the inside of the framing and then turned to extend in crosswise position for engagement of portions of the outside face of the body adjacent the ends of the body with the inside face of the framing at opposite sides of the slot. The fastener further includes means for clamping the body in place in the aforesaid crosswise position comprising a clamp member carried by the body on the outside face thereof for engagement with the outside face of the framing on opposite sides of the slot when the body is generally aligned with and entered into and passed through the slot and also when the body is turned to its crosswise position. The clamping means further comprises retaining means for holding the clamp member in assembly with the body while permitting movement of the clamp member relative to the body between an extended position in which the clamp member is spaced away from the outside face of the body and a retracted position wherein the clamp member is more closely adjacent the outside face of the body. The retaining means comprises a retainer on the inside face of the body and engageable therewith, and guide members extending from the clamp member on opposite sides of the body and having a length greater than the thickness of the body and projecting inwardly from the inside face of the body and said retainer when the clamp member is in its retracted position. At least one of the guide members has a portion bent to provide spring finger means engageable with the retainer on the inside face of the body for providing a spring action tending to draw the clamp member back toward the outside face of the body for clamping the body and clamp member against the inside and outside faces of the framing on opposite sides of the slot.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
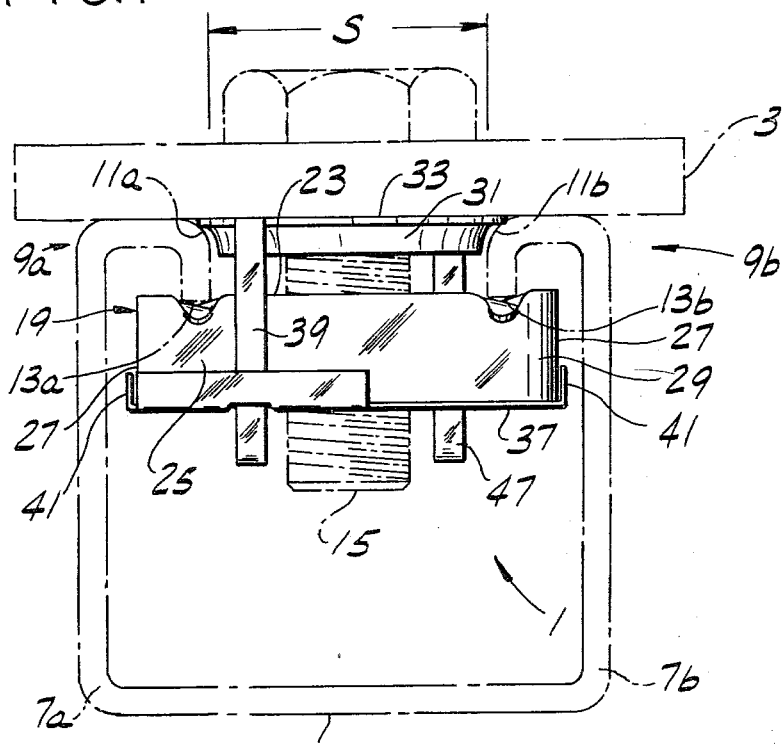
FIG. 1 is an elevation of a part secured to a channel frame by means of a fastener of this invention.

Referring now to the drawings, particularly to FIG. 1, a fastener of this invention is indicated in its entirety at 1 and is shown securing a part 3 (such as a bracket) to a metal channel frame or support 5. This channel has a pair of side flanges 7a, 7b, the outer (upper) ends of which have inwardly directed lips formed thereon as indicated generally at 9a and 9b. These lips are hook-shaped, having curved outside faces 11a, 11b terminating in inside edges 13a, 13b, and are spaced from one another to define a slot S therebetween which extends the length of the channel. As illustrated, part 3 spans slot S and bears on the outside faces 11a, 11b of the channel lips at opposite sides of the slot, the part being locked in position by means of a conventional bolt 15 extending through the part and threaded into a tapped bore 17 in fastener 1.

More particularly, the fastener 1 comprises an elongate body or nut generally designated 19 having an inside (lower) face 21, an outside (upper) face 23, opposite sides 25 and opposite ends 27. While the length of nut 19 is greater than the width of channel slot S (but less than the distance between channel side flanges 7a, 7b), the width of the nut is less than the width of slot S so that the nut may be inserted in and installed on the channel in a manner to be hereinafter described. Diagonally opposite corners of the nut are rounded as indicated at 29 for facilitating such installation.

Carried by nut 19 on the upper face 23 thereof is an annular clamp member or ring 31 having an outer radial flange 33 for engaging the ouside faces 11a, 11b of channel lips 9a, 9b on opposite sides of slot S. Flange 33 has two diametrically opposed notches 35 therein. For holding the ring 31 in assembly with the body, a retaining means is provided and is shown to comprise a retainer or plate member 37 on the inside (lower) face of the nut, and a pair of guide members or arms, each designated 39, bent downwardly from the flange 33 adjacent the notches 35. The plate member 37 has portions bent upwardly therefrom forming a pair of end flanges, each indicated at 41, engageable with opposite ends 27 of the nut 19, and a pair of side flanges, each indicated at 43, engageable with opposite sides of the nut. The end flanges 41 are relatively short in relation to the width of the nut and are located diagonally opposite each other (i.e., toward opposite sides of the nut), and the side flanges 43 are relatively short in relation to the length of the nut and are also located diagonally opposite each other (i.e., toward opposite ends of the nut). A large opening 45 in the center of the plate member 37 is also provided for allowing a bolt threaded in the nut 19 to pass through the member.

The arms 39 are of one-piece construction with the radial flange 33 of ring 31 and extend down on opposite sides of the nut between the nut and the side flanges 43 of the plate member and thence through opening 45 in the plate member. The ends of the arms, which extend down beyond the plate member, are bent to form fingers 47 angled back (up) for engagement with the plate member 37 at 49. It will be apparent therefore that the arms 39 and the end and side flanges 41, 43 of the plate member are interengageable with the nut for preventing substantial relative lengthwise, lateral and rotational movement of the ring 31 and nut 19 thereby to hold the ring securely captive on the nut. This is accomplished without having to slot the nut. It will be understood that the opening 45 in the plate member may have shapes different from that illustrated in the drawings. Moreover, the arms 39 may extend through openings (e.g., slots) in the plate member 37 separate from the opening for a bolt threaded in the nut.

In accordance with this invention, arms 37 are of resilient material such as tempered carbon 1060 steel for permitting relative movement of the ring 31 and the nut 19 between an extended position (see FIG. 1) in which the ring 31 is spaced away from the outside face 23 of the nut, and a retracted position (see FIG. 2) wherein the ring is more closely adjacent the outside face. With the flanged clamping ring 31 immediately adjacent the outside face 23 of the nut 19 (i.e., a retracted position; see FIG. 2), the spacing between the bottom of the ring and the tips of fingers 47 is approximately equal to the thickness of the nut plus that of the plate members 37, fingers 47 thus being unflexed or relaxed. However, with the fastener clamped onto channel 5 as shown in FIG. 1, the ring 31 is spaced from the outside face 23 of the nut and the fingers are accordingly flexed away from the clamping ring toward the bottom of the channel. In this flexed condition, the fingers tend to force or bias the nut and plate member back toward ring 31 for clamping the nut and ring against respective inside edges 13a, 13b and outside faces 11a, 11b of channel lips 9a, 9b at opposite sides of slot S, the fingers thus constituting, in effect, a spring means.

To assure that fastener 1 remains in position (even on a vertical channel) prior to and during the securement of a part to the channel, the inside edges 13a, 13b of channel lips 9a, 9b are received in parallel slots 51 extending across the outside face 23 of the nut at opposite sides of the bore 17, which slots have upstanding teeth 53 therein for providing a firm grip between nut 19 and the channel lips. Inasmuch as flange 33 lies below the plane tangent to the outside faces 11a, 11b of the channel lips, part 3 rests flush against the lips when bolted in position.

Figure 2:
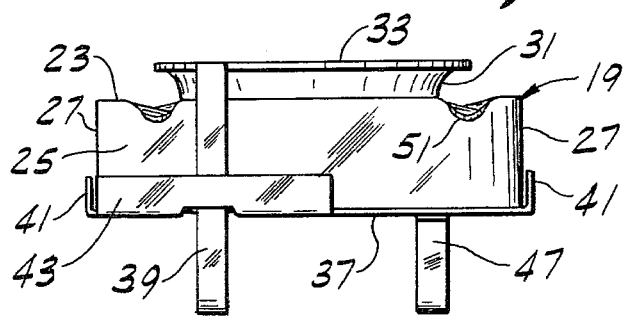
FIG. 2 is a side elevation of the fastener of FIG. 1 showing it removed from the channel.
Figure 3:
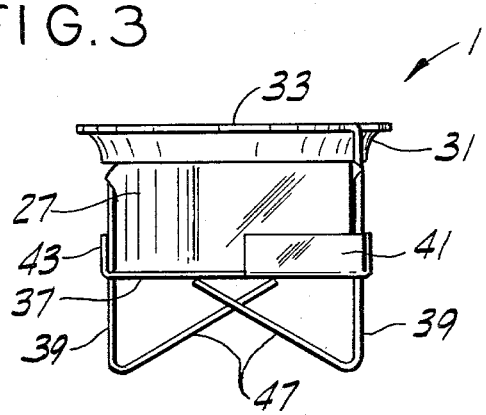
FIG. 3 is a left end elevation of the fastener of FIG. 2.
Figure 4:
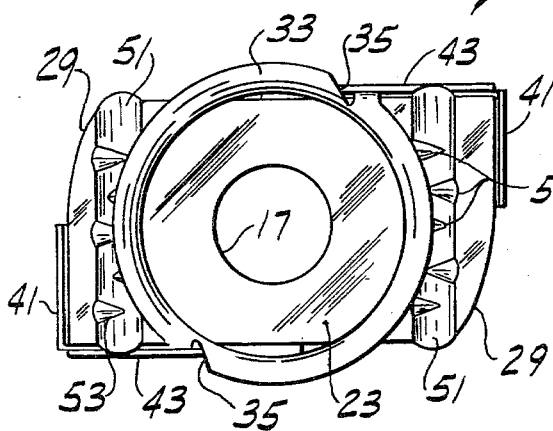
FIG. 4 is a top plan of the fastener shown in FIG. 2.
Figure 5:
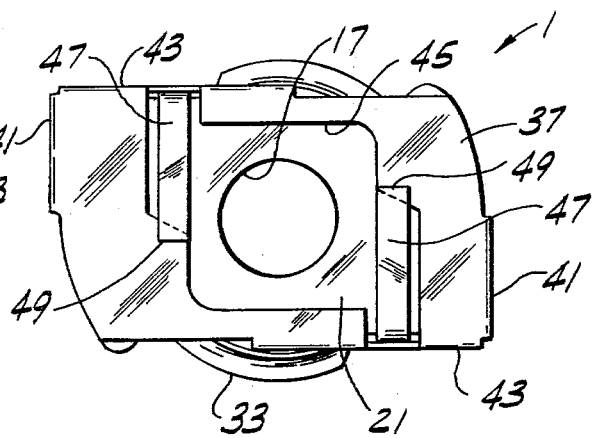
FIG. 5 is a bottom plan of the fastener shown in FIG. 2.

To install fastener 1 on channel 5, the nut 19 is aligned with, entered into and passed through slot S from the outside to the inside thereof until the undersurface of the radial flange 33 on ring 31 engages the channel lip outside faces 11a, 11b (see FIG. 2). The nut is then pushed toward the channel bottom (thus causing the arms 39 to move with respect to the plate member 37 and the spring fingers 47 to flex) and then rotated a quarter turn to the right, or clockwise to a position in which the nut extends crosswise of slot S. The rounded corners 29 of the nut facilitate rotation of the nut to this crosswise position, further rotation being prevented by the unreduced corners which thus ensure proper alignment of serrated slots 51 with channel edges 13a, 13b and assist in holding nut 19 against further turning as bolt 15 is tightened. After the nut has been turned, it is released whereupon the flexed fingers 47 pressing against the inside (lower) face of the plate member 37 at 49 clamp the outside face 23 of the nut against channel lip edges 13a, 13b which are received in slots 43 as shown in FIG. 1. Fastener 1 may be quickly and easily removed from the channel (as for reuse) by simply reversing the steps as set out above.

Thus, it will be observed that the fastener 1 of this invention is readily installed on a channel support and self-retaining thereon after installation. Moveover, the fastener may be used with a channel of any depth and leaves the channel clear of obstructions for freely carrying conductors or the like.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. For securement to metal framing having a slot and inside and outside faces on opposite sides of the slot for attachment of parts to the framing through the slot from the outside of the slot, a fastener comprising:

an elongate body having a first face constituting an inside face and an opposite face constituting an outside face, opposite sides, and opposite ends, the width of said body between said sides being less than the width of the slot in the framing whereby the body may be generally aligned with the slot, entered into the slot and passed through the slot from the outside to the inside of the framing and then turned to extend in crosswise position relative to the slot for engagement of portions of the outside face of the body adjacent the ends of the body with the inside face of the framing at opposite sides of the slot;

means for clamping the body in place in its said crosswise position comprising a clamp member carried by the body on the outside face of the body for engagement with the outside face of the framing on opposite sides of the slot when the body is generally aligned with and entered into and passed through the slot and also when the body is turned to its said crosswise position; and retaining means for holding the clamp member in assembly with the body while permitting movement of the clamp member relative to said body between an extended position in which the clamp member is spaced away from the outside face of the body and a retracted position wherein the clamp member is more closely adjacent the outside face of the body, said retaining means comprising a retainer on the inside face of the body, and guide members extending from the clamp member on opposite sides of the body having a length greater than the thickness of said body and projecting inwardly beyond the inside face of the body and said retainer when said clamp member is in its said retracted position, at least one of said guide members having a portion bent to provide spring finger means engageable with said retainer on the inside face of the body for providing spring action tending to draw the clamp member in the direction back toward the outside face of the body for clampwise engagement of the body and clamp member with portions of the framing on opposite sides of the slot.

2. A fastener as set forth in claim 1 wherein said retainer comprises a plate member.

3. A fastener as set forth in claim 2 wherein each guide member extends through an opening in said plate member and is movable with respect thereto for relative movement of the clamp member between said extended and retracted positions.

4. A fastener as set forth in claim 2 wherein said plate member has portions engageable with opposite ends of the body for preventing relative lengthwise movement of the clamp member and body.

5. A fastener as set forth in claim 4 wherein said portions comprise a pair of flanges, each being relatively short in relation to the width of said body, said flanges being at opposite ends of the body toward opposite sides thereof.

6. A fastener as set forth in claim 2 wherein said plate member has portions engageable with opposite sides of the body, said portions and said guide members preventing relative lateral and rotational movement of the clamp member and body.

7. A fastener as set forth in claim 6 wherein said guide members extend between said nut and said side portions through the plate member.

8. A fastener as set forth in claim 6 wherein said portions comprise a pair of flanges, each being relatively short in relation to the length of said body, said flanges being at opposite sides of the body toward opposite ends thereof.

* * * * *